US012693246B2

(12) United States Patent
Nitta et al.

(10) Patent No.: US 12,693,246 B2
(45) Date of Patent: Jul. 28, 2026

(54) CRYSTAL PHASE INFORMATION EXTRACTION APPARATUS, CRYSTAL PHASE INFORMATION EXTRACTION METHOD AND STORAGE MEDIUM

(71) Applicant: Niterra Materials Co., Ltd, Nagoya (JP)

(72) Inventors: Shuhei Nitta, Tokyo (JP); Naoyuki Sanada, Kawasaki Kanagawa (JP); Seiichi Suenaga, Yokohama Kanagawa (JP); Katsuyuki Aoki, Yokohama Kanagawa (JP); Kentaro Iwai, Yokohama Kanagawa (JP); Yoshihito Yamagata, Yokohama Kanagawa (JP)

(73) Assignee: Niterra Materials Co., Ltd., Yokohama (JP)

( * ) Notice: Subject to any disclaimer, the term of this patent is extended or adjusted under 35 U.S.C. 154(b) by 134 days.

(21) Appl. No.: 18/761,689

(22) Filed: Jul. 2, 2024

(65) Prior Publication Data

US 2024/0353357 A1     Oct. 24, 2024

Related U.S. Application Data

(63) Continuation of application No. PCT/JP2023/004810, filed on Feb. 13, 2023.

(30) Foreign Application Priority Data

Sep. 15, 2022     (JP) .................................. 2022-147319

(51) Int. Cl.
*G01N 23/207*          (2018.01)
(52) U.S. Cl.
CPC ................................ *G01N 23/2073* (2013.01)

(58) Field of Classification Search
CPC ............. G01N 23/2073; G01N 23/207; G01N 23/2055
See application file for complete search history.

(56) References Cited

U.S. PATENT DOCUMENTS

| | | | |
|---|---|---|---|
| 6,081,579 A | 6/2000 | Nagano et al. | |
| 11,300,529 B2 | 4/2022 | Ohbuchi et al. | |

(Continued)

FOREIGN PATENT DOCUMENTS

| | | |
|---|---|---|
| CN | 110609048 A | 12/2019 |
| JP | H9-297112 A | 11/1997 |

(Continued)

OTHER PUBLICATIONS

Japan Patent Office, International Search Report for PCT/JP2023/004810 (Apr. 11, 2023).

(Continued)

*Primary Examiner* — Kiho Kim
(74) *Attorney, Agent, or Firm* — Finnegan, Henderson, Farabow, Garrett & Dunner, LLP

(57) ABSTRACT

According to one embodiment, a crystal phase information extraction apparatus includes a first estimation unit and a second estimation unit. The first estimation unit estimates first crystal phase information on a first polycrystalline material. The second estimation unit performs, using the first crystal phase information, iterative optimization on diffraction data acquired from a second polycrystalline material having a component ratio of a crystal phase of interest smaller than that of the first polycrystalline material, and estimates second crystal phase information on the second polycrystalline material.

10 Claims, 5 Drawing Sheets

(56)    References Cited

U.S. PATENT DOCUMENTS

| | | | | |
|---|---|---|---|---|
| 2005/0199924 A1* | 9/2005 | Fox | ........................ | H10D 1/682 |
| | | | | 257/295 |
| 2018/0228613 A1* | 8/2018 | Jones | ..................... | B33Y 50/00 |
| 2019/0041342 A1 | 2/2019 | Ohbuchi et al. | | |
| 2021/0080407 A1 | 3/2021 | Tsubota | | |
| 2023/0304975 A1 | 9/2023 | Tamai | | |

FOREIGN PATENT DOCUMENTS

| | | | | | | |
|---|---|---|---|---|---|---|
| JP | 2018-205101 A | | 12/2018 | | | |
| JP | 2020519868 A | * | 7/2020 | ............. | G01N 23/20 |
| JP | 6845405 B2 | | 3/2021 | | | |
| WO | WO 2017/141973 A1 | | 8/2017 | | | |
| WO | WO 2022/044383 A1 | | 3/2022 | | | |

OTHER PUBLICATIONS

Japan Patent Office, Office Action in JP App. No. 2022-147319 (Dec. 16, 2025).

\* cited by examiner

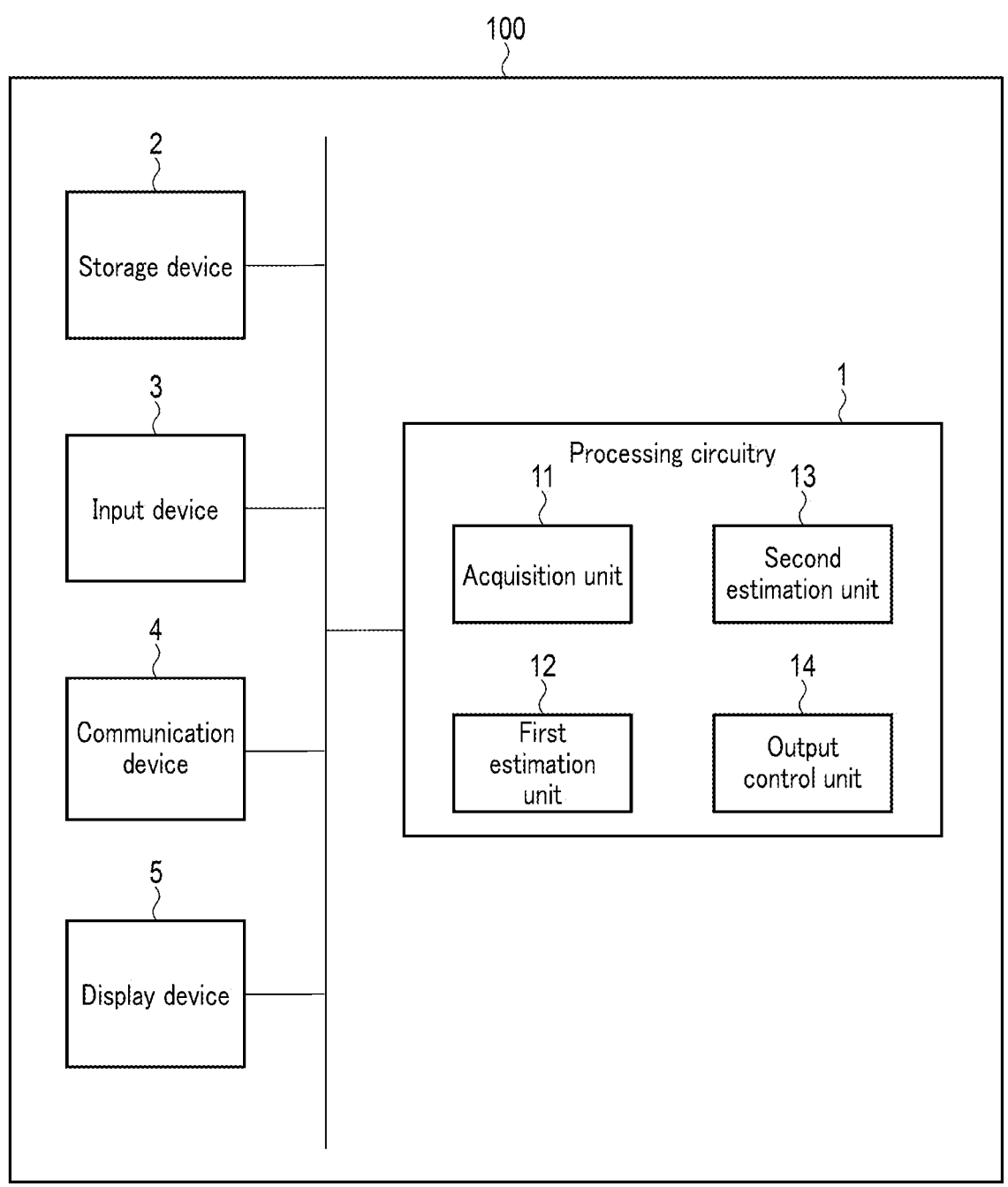
F I G. 1

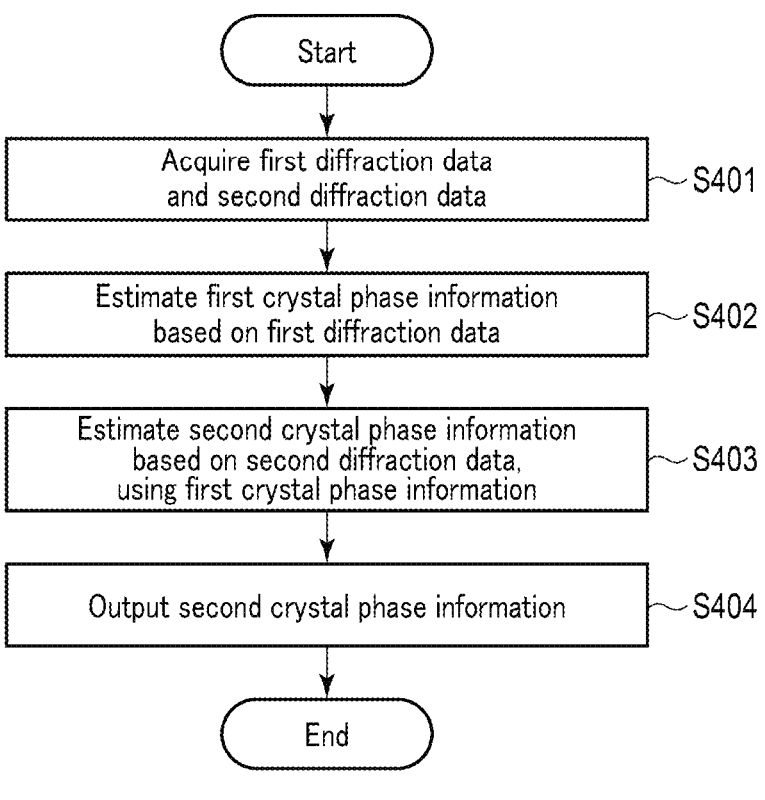

```
                    ┌───────────┐
                    │   Start   │
                    └───────────┘
                          │
                          ▼
    ┌─────────────────────────────────────────┐
    │     Acquire first diffraction data      │
    │       and second diffraction data       │───S401
    └─────────────────────────────────────────┘
                          │
                          ▼
    ┌─────────────────────────────────────────┐
    │   Estimate first crystal phase information│
    │       based on first diffraction data    │───S402
    └─────────────────────────────────────────┘
                          │
                          ▼
    ┌─────────────────────────────────────────┐
    │  Estimate second crystal phase information│
    │       based on second diffraction data,   │───S403
    │      using first crystal phase information │
    └─────────────────────────────────────────┘
                          │
                          ▼
    ┌─────────────────────────────────────────┐
    │    Output second crystal phase information│───S404
    └─────────────────────────────────────────┘
                          │
                          ▼
                    ┌───────────┐
                    │    End    │
                    └───────────┘
```

FIG. 4

```
      51                                                    52
 ┌──────────┐                                        ┌──────────┐
 │  First   │                                        │  Second  │
 │diffraction│                                       │diffraction│
 │   data   │                                        │   data   │
 └──────────┘                                        └──────────┘
      │                                                    │
      │         12              53              13         │
      ▼                                                    ▼
 ┌──────────┐        ┌──────────┐        ┌──────────┐
 │  First   │───────▶│First crystal│─────▶│  Second  │
 │estimation│        │phase       │      │estimation│
 │  unit    │        │information │      │  unit    │
 └──────────┘        └──────────┘        └──────────┘
                                                 │    54
                                                 ▼
                                          ┌──────────┐
                                          │ Second   │
                                          │crystal   │
                                          │phase     │
                                          │information│
                                          └──────────┘
```

FIG. 5

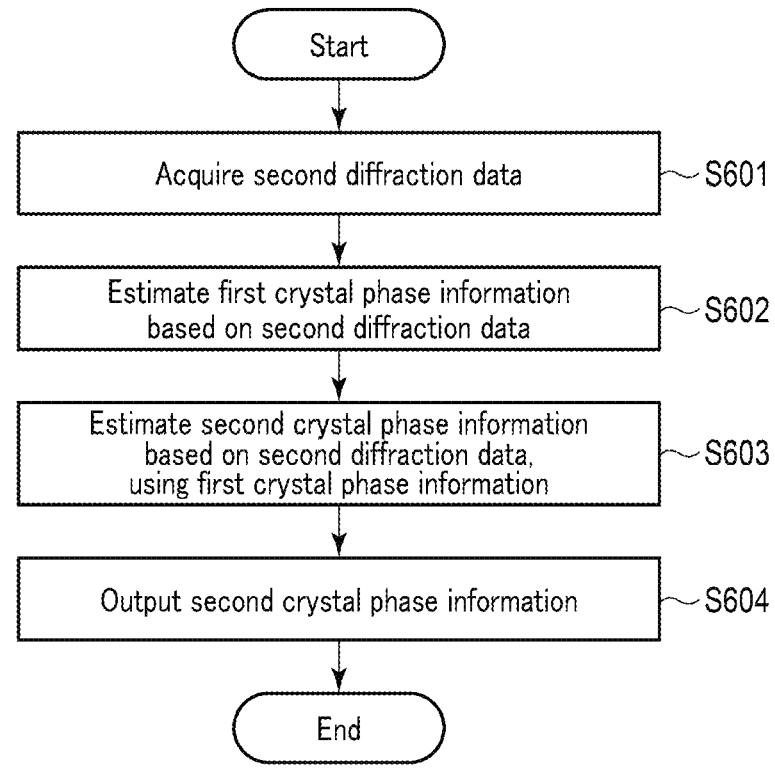
Start
Acquire second diffraction data    ∽S601
Estimate first crystal phase information based on second diffraction data    ∽S602
Estimate second crystal phase information based on second diffraction data, using first crystal phase information    ∽S603
Output second crystal phase information    ∽S604
End
F I G. 6
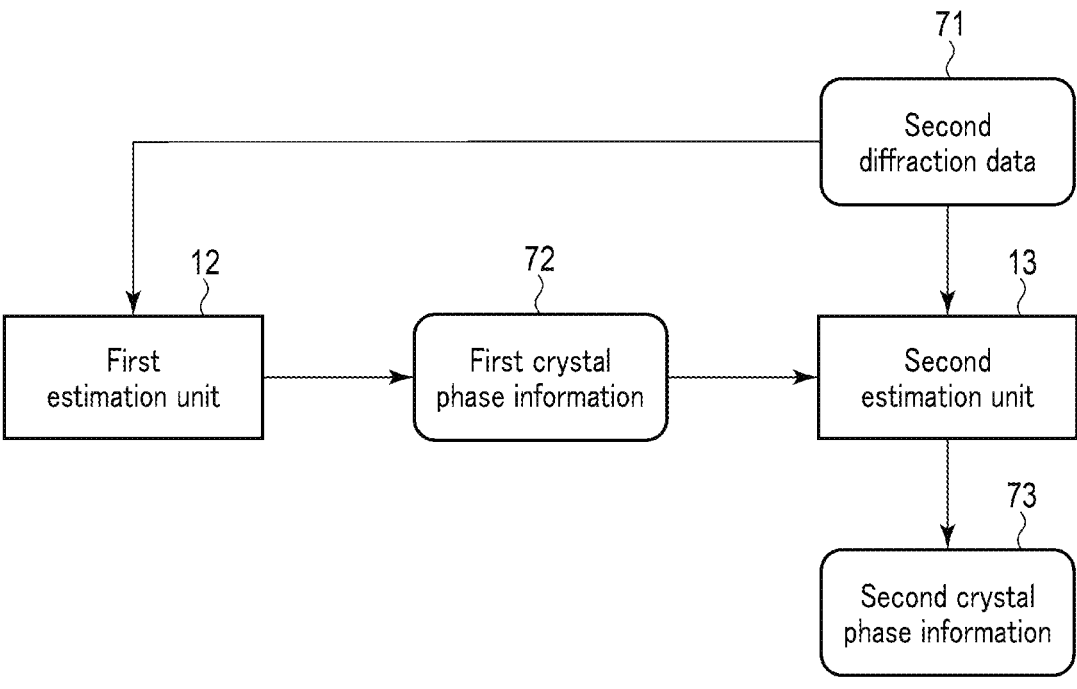
F I G. 7

CRYSTAL PHASE INFORMATION EXTRACTION APPARATUS, CRYSTAL PHASE INFORMATION EXTRACTION METHOD AND STORAGE MEDIUM

CROSS-REFERENCE TO RELATED APPLICATION(S)

This application is a Continuation Applications of PCT Application No. PCT/JP2023/004810, filed Feb. 13, 2023 and based upon and claims the benefit of priority from the Japanese Patent Application No. 2022-147319, filed Sep. 15, 2022, the entire contents of which are incorporated herein by reference.

FIELD

Embodiments described herein relate generally to a crystal phase information extraction apparatus, a crystal phase information extraction method and storage medium.

BACKGROUND

A method of extracting crystal phase information such as a scale factor and a lattice constant of a polycrystalline material is known. For the extraction of the crystal phase information, iterative optimization such as a Rietveld analysis is used. In the Rietveld analysis, the crystal phase information of a target polycrystalline material is extracted by optimizing the crystal phase information so as to reduce an error between reconstructed data based on the crystal phase information under estimation and X-ray diffraction spectrum data which is measurement data. For example, an initial value of a scale factor, which is one item of crystal phase information, is set based on a content ratio of main elements of a polycrystalline material such as a cement sample, and optimization is performed. However, in some cases, the crystal phase information cannot be extracted accurately or stably by initializing only the scale factor based on the content ratio of the main elements.

BRIEF DESCRIPTION OF THE DRAWING(S)

FIG. 1 is a diagram showing a configuration example of a crystal phase information extraction apparatus.

FIG. 4 is a diagram showing an example of a processing procedure of crystal phase information extraction processing according to Example 1.

FIG. 5 is a diagram showing a flow of various data in the crystal phase information extraction processing according to Example 1.

FIG. 6 is a diagram showing an example of a processing procedure of crystal phase information extraction processing according to Example 2.

FIG. 7 is a diagram showing a flow of various data in the crystal phase information extraction processing according to Example 2.

DETAILED DESCRIPTION

Figure 2:
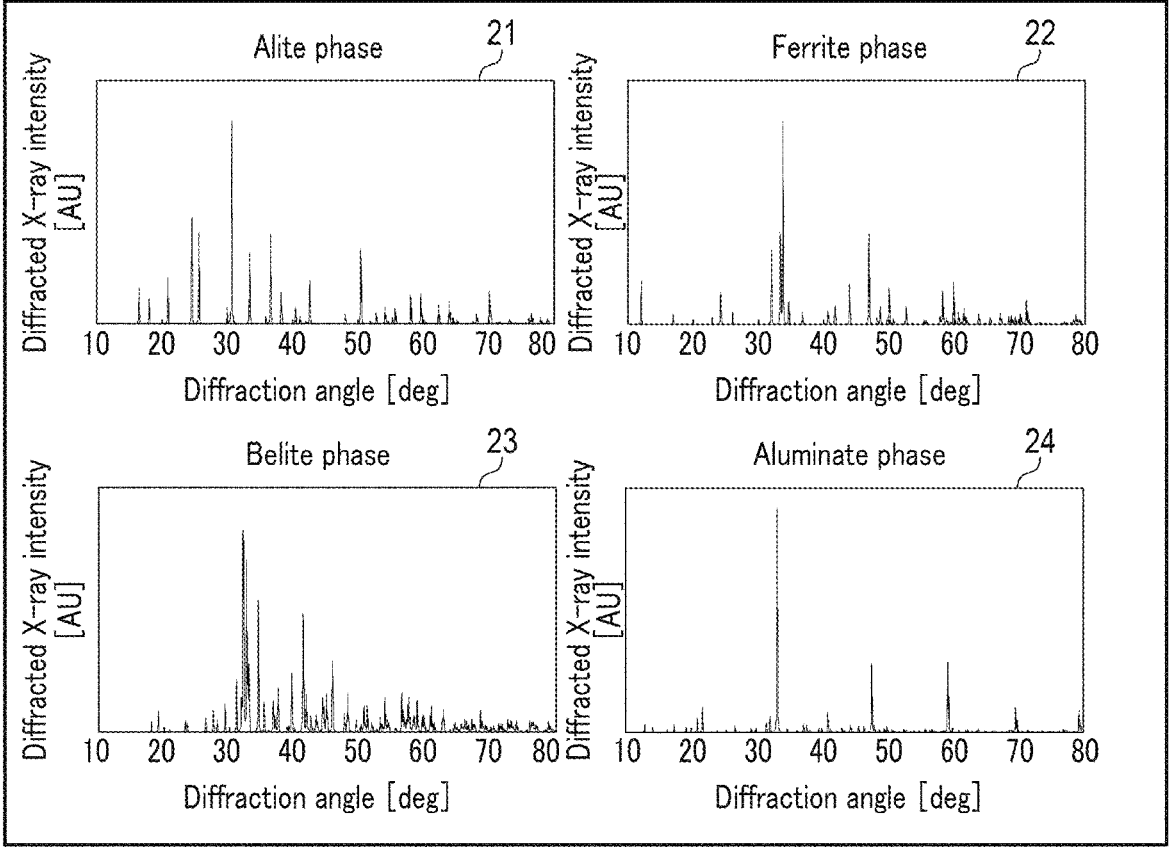
FIG. 2 is a diagram showing calculated profiles of diffraction data for four crystal phases of cement.

In general, according to one embodiment, a crystal phase information extraction apparatus includes a first estimation unit and a second estimation unit. The first estimation unit estimates first crystal phase information on a first polycrystalline material. The second estimation unit performs, using the first crystal phase information, iterative optimization on diffraction data acquired from a second polycrystalline material having a component ratio of a crystal phase of interest smaller than that of the first polycrystalline material, and estimates second crystal phase information on the second polycrystalline material.

A crystal phase information extraction apparatus, method, and storage medium according to the present embodiment will be described below with reference to the drawings.

FIG. 1 is a diagram showing a configuration example of a crystal phase information extraction apparatus 100 according to the present embodiment. As shown in FIG. 1, the crystal phase information extraction apparatus 100 is a computer including a processing circuitry 1, a storage device 2, an input device 3, a communication device 4, and a display device 5. Data communication among the processing circuitry 1, the storage device 2, the input device 3, the communication device 4, and the display device 5 is performed via a bus.

The processing circuitry 1 includes a processor such as a central processing unit (CPU) and a memory such as a random access memory (RAM). The processing circuitry 1 includes an acquisition unit 11, a first estimation unit 12, a second estimation unit 13, and an output control unit 14. The processing circuitry 1 executes a crystal phase information extraction program to realize the functions of the units 11 to 14. The crystal phase information extraction program is stored in a non-transitory computer-readable recording medium such as the storage device 2. The crystal phase information extraction program may be implemented as a single program describing all the functions of the respective units 11 to 14, or may be implemented as a plurality of modules divided into units of several functions. Further, the units 11 to 14 described above may be implemented by an integrated circuit such as an application specific integrated circuit (ASIC). In this case, the units may be implemented in a single integrated circuit or may be implemented individually in a plurality of integrated circuits.

The acquisition unit 11 acquires diffraction data acquired from polycrystalline materials. The polycrystalline materials according to the present embodiment are intended to have a common diffraction peak. The diffraction data is typically X-ray diffraction spectrum data obtained by an X-ray diffractometer. However, the diffraction data according to the present embodiment may be diffraction spectrum data by electromagnetic waves other than X-rays or particle beams such as neutron beams. The acquisition unit 11 acquires first diffraction data and second diffraction data. The second diffraction data is diffraction data related to the polycrystalline material to be analyzed (hereinafter referred to as a second polycrystalline material). The first diffraction data is analysis data on a polycrystalline material that is not an analysis target (hereinafter referred to as a first polycrystalline material). The first polycrystalline material and the second polycrystalline material are the same kind of polycrystalline material having a common diffraction peak. The diffraction peak means a maximum value of X-ray diffraction spectrum data. The diffraction peak may be simply referred to as a peak.

The first estimation unit 12 estimates crystal phase information (hereinafter referred to as first crystal phase information) on the first polycrystalline material. As an example, the first estimation unit 12 estimates the first crystal phase information by performing iterative optimization on the first diffraction data. The crystal phase information means a set of various parameters (hereinafter referred to as crystal phase information parameters) related to diffraction data of a corresponding polycrystalline material. As an example, the crystal phase information parameters include a peak shift parameter, a background parameter, a scale factor of each phase, a crystal structure parameter of each phase, and/or a profile parameter of each phase. The peak shift parameter and the background parameter are parameters of measurement factors that are not classified into the crystal phases. The peak shift parameter is a parameter representing a shift of a peak included in the diffraction data. The background parameter is a parameter representing a component that appears in the diffraction data due to a factor other than the polycrystalline material to be measured. The scale factor of each phase is a parameter representing an integrated intensity of the peak of each phase. The crystal structure parameter of each phase is a parameter representing the lattice constant and atomic position of each phase. The profile parameter of each phase is a parameter representing a spread of the diffraction spectrum depending on the crystallinity of each phase. Typically, the crystal phase information is represented by a vector which is a series of numerical values of a plurality of crystal phase parameters.

The second estimation unit 13 estimates second crystal phase information on the second polycrystalline material. The second estimation unit 13 estimates the second crystal phase information by performing iterative optimization on the second diffraction data acquired from the second polycrystalline material, using the first crystal phase information.

The output control unit 14 outputs various data. As an example, the output control unit 14 displays the first crystal phase information and the second crystal phase information on the display device 5, stores the information in the storage device 2, or transmits the information to another computer via the communication device 4.

The storage device 2 is comprised of a read only memory (ROM), a hard disk drive (HDD), a solid state drive (SSD), an integrated circuit storage device, or the like. The storage device 2 stores a crystal phase information extraction program and the like.

Various commands from a user are input to the input device 3. As the input device 3, a keyboard, a mouse, various switches, a touch pad, a touch panel display, or the like can be used. An output signal from the input device 3 is supplied to the processing circuitry 1. The input device 3 may be an input device of a computer connected to the processing circuitry 1 via a wire or wirelessly.

The communication device 4 is an interface for performing data communication with an external device connected to the crystal phase information extraction apparatus 100 via a network.

The display device 5 displays various kinds of information. For example, the display device 5 displays various data under the control of the output control unit 14. As the display device 5, a cathode-ray tube (CRT) display, a liquid crystal display, an organic electroluminescence (EL) display, a light-emitting diode (LED) display, a plasma display, or any other display known in the relevant technical field may be used as appropriate. The display device 5 may be a projector.

The crystal phase information extraction apparatus 100 may be a computer incorporated into a measurement device, such as an X-ray diffractometer, for measuring diffraction data, or may be a computer separate from the measurement device.

An operation example of the crystal phase information extraction apparatus 100 according to the present embodiment will be described below.

In the following description, the polycrystalline material is assumed to be cement. The cement includes four crystal phases: an alite phase, belite phase, ferrite phase, and aluminate phase.

FIG. 2 is a diagram exemplifying calculated profiles 21, 22, 23, and 24 of diffraction data for four crystal phases of cement. The vertical axis of the calculated profiles 21, 22, 23, and 24 shown in FIG. 2 represents a diffracted X-ray intensity [AU], and the horizontal axis represents a diffraction angle [deg]. As shown in the calculated profile 21 of the alite phase, the calculated profile 22 of the ferrite phase, the calculated profile 23 of the belite phase, and the calculated profile 24 of the aluminate phase, the diffraction data of the four crystal phases includes many diffraction peaks having diffraction angles close to each other. In the present embodiment, the component ratio of the alite phase, the belite phase, the ferrite phase, and the aluminate phase of the cement to be analyzed is about 7:2:0.5:0.5, and a situation is assumed in which extraction of crystal phase information on the ferrite phase and the aluminate phase, affecting the strength and the durability, is difficult. That is, the "crystal phase of interest" is the ferrite phase or the aluminate phase. In this case, the main phase is the alite phase or the belite phase, and the sub-phase is the ferrite phase or the aluminate phase. The cement to be analyzed comprises polycrystalline materials having common diffraction peaks. Adjacent diffraction peaks mean two or more diffraction peaks that appear in a relatively narrow range of diffraction angles.

Figure 3:
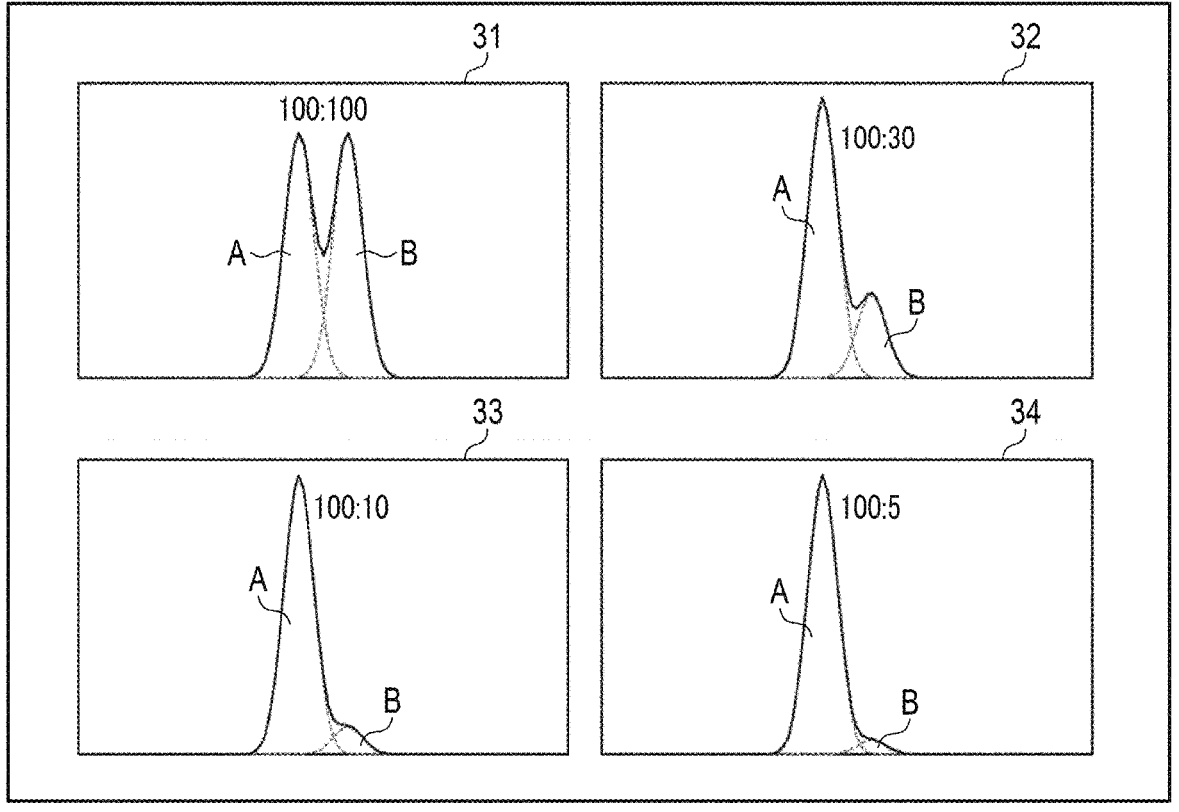
FIG. 3 is a schematic diagram showing diffraction data of a crystalline material including a crystal phase A and a crystalline phase B.

FIG. 3 is a schematic diagram showing diffraction data 31, 32, 33, and 34 for a crystalline material including a crystal phase A and a crystal phase B. It is assumed that the crystal phase A is the main phase and the crystal phase B is the sub-phase. As shown in FIG. 2, the component ratio of the crystal phase A and the crystal phase B is 100:100 in the diffraction data 31, 100:30 in the diffraction data 32, 100:10 in the diffraction data 33, and 100:5 in the diffraction data 34. The diffraction peak of the crystal phase A and the diffraction peak of the crystal phase B are at diffraction angles close to each other. The component ratio is determined on the assumption that the largest diffraction peak is 100. If the difference in the component ratio of the crystal phase B to the crystal phase A is relatively small (for example, 100:100 or 100:30), each of the diffraction peak of the crystal phase A and the diffraction peak of the crystal phase B forms a local maximum point. On the other hand, if the difference in the component ratio of the crystal phase B to the crystal phase A is relatively large (for example, 100:10 or 100:5), the diffraction peak of the crystal phase B is buried in the diffraction peak of the crystal phase A, and the diffraction peak of the crystal phase B does not form a maximum point. In other words, when the difference in the component ratio of the crystal phase B to the crystal phase A is relatively large, the number of peaks of the diffraction data of the crystalline material decreases as compared with the case where the difference in the component ratio of the crystal phase B to the crystal phase A is relatively small. In such a case, the crystalline material is expressed as having a common diffraction peak. That is, the common diffraction peak is a plurality of adjacent diffraction peaks which appear in a relatively narrow range of diffraction angles and which are related to different crystal phases, and in the case where the component ratio is relatively large, the common diffraction peak indicates a diffraction peak in a relationship in which one diffraction peak is buried in the other diffraction peak.

As a comparative example of the present embodiment, there is a technique of performing optimization by setting an initial value of a scale factor which is one item of crystal phase information from a content ratio of main elements of a target polycrystalline material. In such initialization of only the scale factor based on the content ratio of the main elements, it may be difficult to execute optimization accurately or stably. For example, in the case where the scale factor is affected not only by the content ratio of the main elements but also by the thermal condition during the production for a polycrystalline material including a common diffraction peak, or in the case of optimization setting in which the influence of the initial value other than the crystal phase information other than the scale factor is large, the accuracy of the optimization of the scale factor may be lowered.

In general, iterative optimization for estimating crystal phase information, such as Rietveld analysis, is often an under-determined problem because each phase has a common diffraction peak and contains measurement noise, and therefore, an initial value at the start of optimization and effective regularization during optimization are important from the viewpoint of accuracy and stability. For example, as in the diffraction data 34 of FIG. 3, in the case where the diffraction peak of the crystal phase B of the minority component of interest is small and is buried in the diffraction peak of the crystal phase A of the adjacent main component, the optimization is not correctly performed depending on the initial value or the amount of observation noise, and a local solution in which the scale factor of the crystal phase B is a zero value or a negative value may be obtained. The reduction in accuracy or the destabilization of the optimization is particularly problematic in a case where there are a plurality of pieces of second diffraction data and it is desired to perform a multi-sample statistical analysis of the extracted crystal phase information.

The crystal phase information extraction apparatus 100 according to the present embodiment executes crystal phase information extraction processing for avoiding a situation in which the local solution occurs. Hereinafter, Example 1 and Example 2 of the crystal phase information extraction processing according to the crystal phase information extraction apparatus 100 will be described.

Example 1

FIG. 4 is a diagram showing an example of a processing procedure of crystal phase information extraction processing according to Example 1, and FIG. 5 is a diagram showing a flow of various data in the crystal phase information extraction processing according to Example 1.

As shown in FIGS. 4 and 5, the acquisition unit 11 acquires the first diffraction data 51 and the second diffraction data 52 (step S401). In step S401, the acquisition unit 11 may acquire the first diffraction data 51 and the second diffraction data 52 from a measurement device such as an X-ray diffractometer, a database storing diffraction data, or any other computer. The first diffraction data 51 and the second diffraction data 52 are X-ray diffraction spectrum data related to cement which is a polycrystalline material. The first diffraction data 51 is X-ray diffraction spectrum data of the first polycrystalline material (cement) produced under a first production condition. The second diffraction data 52 is X-ray diffraction spectrum data of the second polycrystalline material (cement) produced under a second production condition. The first polycrystalline material and the second polycrystalline material are the same kind of polycrystalline material having a common diffraction peak. The second polycrystalline material is a polycrystalline material to be actually analyzed.

The first polycrystalline material is a material prepared such that the component ratio of the crystal phase of interest is higher than the component ratio of the crystal phase of the second polycrystalline material and the number of peaks of common diffraction data is not reduced. In other words, the first production condition is a production condition under which the diffraction peak of the crystal phase of interest is not buried in the common diffraction peak of the main phase having a large component ratio. Here, the crystal phase of interest is not a main crystal phase having a relatively high component ratio (main phase), but a crystal phase having a relatively low component ratio (sub-phase). The second polycrystalline material is assumed to be a material prepared such that the component ratio of the crystal phase of interest is lower than the component ratio of the crystal phase of the first polycrystalline material and the number of peaks of common diffraction data is reduced.

The production conditions include factors of raw materials, mixing conditions, and thermal conditions (sintering conditions). Raw materials mean the types and amounts of materials contained in the cement, which are polycrystalline material. The raw materials are calcium oxides ($CaO$), silica ($SiO_2$), iron oxides ($Fe_2O_3$), and alumina ($Al_2O_3$). The ferrite phase can be increased by increasing the iron oxide, and the aluminate phase can be increased by increasing the alumina. In the case of Example 1, for example, the amount of iron oxide or alumina which is the first polycrystalline material is larger than that of the second polycrystalline material, so that the number of peaks of the first diffraction data cannot be reduced.

The mixing conditions mean conditions relating to the mixing of the raw materials. For example, cement is produced by sintering raw materials pulverized into fine powder while stirring and mixing them in a sintering furnace such as a rotary kiln. By changing the inclination angle of the rotary kiln, the conveying length of the raw materials, and the number of rotations, the dispersibility of the four kinds of raw material fine powders is controlled, and the ratio of the precipitated crystal phase can be controlled. In the case of this mixing method, the mixing conditions include, for example, the inclination angle of the rotary kiln, the conveyance length of the raw materials, and the number of rotations.

The thermal conditions mean conditions for sintering of the mixed raw materials. For example, the mixed raw materials are fired at a temperature of 1350 to 1550° C. for about 30 minutes to 2 hours, and then cooled down with cold air. By changing the sintering temperature, the sintering time, and the cooling rate, the ratio of the crystal phase to be precipitated can be controlled. In the case of the sintering method, the thermal conditions include, for example, the sintering temperature, the sintering time, and the cooling rate. For example, by setting the sintering temperature of the first production condition to be lower than that of the second production condition, the precipitation of the alite phase is suppressed, and the ratio of the aluminate phase and the ferrite phase can be relatively increased.

After step S401, the first estimation unit 12 estimates the first crystal phase information 53 based on the first diffraction data 51 acquired in step S401 (step S402). In step S402, the first estimation unit 12 performs iterative optimization on the first diffraction data 51 obtained from the first polycrystalline material produced under the first production conditions different from those for the second polycrystalline material, and estimates the first crystal phase information 53. More specifically, the first estimation unit 12 calculates X-ray diffraction spectrum data reconstructed from the first crystal phase information under estimation (reconstructed data), calculates an error between the first diffraction data 51 and the reconstructed data, and updates the first crystal phase information so as to reduce the error. The first estimation unit 12 repeats the calculation of the reconstructed data, the calculation of the error, and the updating of the first crystal phase information until the stop condition is satisfied. If the stop condition is satisfied, the first crystal phase information at the number of updates is output as the first crystal phase information 53 of the fixed version. The stop condition may be set to any particular, such as that the number of updates reaches a predetermined value, that the error is below or equal to a threshold value or less, or the like. The predetermined value and the threshold value may be set to discretionary values. As an algorithm for the iterative optimization, a diffraction data analysis method assuming a crystal structure model, such as a Rietveld analysis, is applicable. The initial value of the first crystal phase information under estimation may be set to a predetermined value such as a zero value or a random value determined according to a random function for each item.

After step S402, the second estimation unit 13 estimates the second crystal phase information 54 based on the second diffraction data 52 acquired in step S401, using the first crystal phase information 53 estimated in step S402 (step S403). In step S403, the second estimation unit 13 estimates the second crystal phase information 54 by performing iterative optimization such as a Rietveld analysis on the second diffraction data 52. More specifically, the second estimation unit 13 calculates X-ray diffraction spectrum data (reconstructed data) reconstructed from the second crystal phase information under estimation, calculates an error between the second diffraction data 52 and the reconstructed data, and updates the second crystal phase information so as to reduce the error.

The initial value of the second crystal phase information 54 under estimation is set to the first crystal phase information 53 estimated in step S402. As described above, it is assumed that the peak related to the sub-phase is not buried in the peak related to the main phase in the first diffraction data 51, whereas the peak related to the sub-phase is buried in the peak related to the main phase in the second diffraction data 53. That is, the number of peaks of the first diffraction data 51 is larger than the number of peaks of the second diffraction data 52. Accordingly, the number of peaks of the diffraction data of the sub-phase based on the first crystal phase information 53 is larger than the number of peaks of the diffraction data of the sub-phase based on the second crystal phase information 54. By performing iterative optimization on the second diffraction data under these conditions, since the iterative optimization is started from the conditions in which the component ratio of the small amount of the crystal phase of interest is large, it is possible to avoid the occurrence of a local solution as described above in which the crystal phase component relating to the common diffraction peak is overlooked.

After step S403, the output control unit 14 outputs the second crystal phase information 54 estimated in step S403 (step S404). In step S404, the output control unit 14 may display the second crystal phase information 54 on the display device 5, for example. Thus, the user can check the second crystal phase information 54. At this time, the output control unit 14 may display the first crystal phase information 53 on the display device 5 together with the second crystal phase information 54. This allows the user to check the first crystal phase information 53, which is the initial value of the iterative optimization, and to evaluate the reliability of the iterative optimization for obtaining the second crystal phase information 54.

As another output example, the output control unit 14 may record the second crystal phase information 54 and the first crystal phase information 53 in a recording medium, or may transfer the information to another computer via the communication device 4.

Thus, the crystal phase information extraction processing according to Example 1 is completed.

The crystal phase information extraction processing according to Example 1 can be similarly performed on a plurality of second polycrystalline materials. By performing the crystal phase information extraction processing on the plurality of second polycrystalline materials, the processing circuitry 1 can perform a multi-sample statistical analysis. According to Example 1, the initial value of the second crystal phase information of the iterative optimization is uniformly set to the same first crystal phase information for the plurality of second polycrystalline materials. This makes it possible to stabilize the iterative optimization for the plurality of second polycrystalline materials.

Example 2

The crystal phase information extraction apparatus 100 according to Example 2 does not use the first diffraction data. The first estimation unit 12 estimates the first crystal phase information based on the second diffraction data. The crystal phase information extraction processing according to Example 2 will be described below.

FIG. 6 is a diagram showing an example of a processing procedure of the crystal phase information extraction processing according to Example 2, and FIG. 7 is a diagram showing a flow of various data of the crystal phase information extraction processing according to Example 2.

As shown in FIGS. 6 and 7, the acquisition unit 11 acquires the second diffraction data 71 (step S601). The second diffraction data 71 is the same as the second diffraction data 52 according to Example 1. That is, the second diffraction data 71 is X-ray diffraction spectrum data of the second polycrystalline material (cement) produced under a second production condition. The second polycrystalline material is a polycrystalline material to be actually analyzed.

After step S601, the first estimation unit 12 estimates the first crystal phase information 72 based on the second diffraction data 71 acquired in step S601 (step S602). In step S602, the first estimation unit 12 processes the second diffraction data 71 to generate diffraction data related to a pseudo first polycrystalline material, and performs iterative optimization on the diffraction data to estimate the first crystal phase information 72 on the pseudo first polycrystalline material. The diffraction data based on the pseudo first polycrystalline material is similar in shape to the diffraction data acquired from a true first polycrystalline material (the polycrystalline material produced under the first production conditions) with respect to the common diffraction peak. As an example, the first estimation unit 12 can generate diffraction data related to the pseudo first polycrystalline material by modifying the parameter of the scale factor of the second diffraction data 71. As another example, the first estimation unit 12 may generate diffraction data related to the pseudo first polycrystalline material by manually deforming the shape of the second diffraction data 71 via the input device 3 or the like, so that the shape of the second diffraction data 71 approximates diffraction data based on the true first crystal phase information. Similarly to Example 1, as an algorithm for the iterative optimization, a diffraction data analysis method assuming a crystal structure model, such as a Rietveld analysis, is applicable.

After step S602, the second estimation unit 13 estimates the second crystal phase information 73 based on the second diffraction data 71 acquired in step S601, using the first crystal phase information 72 estimated in step S602 (step S603). Contents of the processing of step S603 are the same as those of step S403.

In Example 2, the initial value of the second crystal phase information 54 under estimation is also set to the first crystal phase information 72 estimated in step S602. By performing iterative optimization on the second diffraction data under the conditions, since the iterative optimization is started from the conditions in which the component ratio of the small amount of the crystal phase of interest is large, it is possible to avoid the occurrence of a local solution as described above in which the crystal phase component relating to the common diffraction peak is overlooked.

After step S603, the output control unit 14 outputs the second crystal phase information 73 estimated in step S603 (step S604). Contents of the processing of step S604 are the same as those of step S404.

Thus, the crystal phase information extraction processing according to Example 2 is completed.

The crystal phase information extraction processing according to Example 2 does not require collecting the first diffraction data by performing X-ray diffraction measurement on the actual first crystal phase material. Therefore, it is possible to eliminate the time and effort for collecting the first diffraction data compared to Example 1.

The crystal phase information extraction processing according to Example 2 can also be performed on a plurality of second polycrystalline materials. By performing the crystal phase information extraction processing on the plurality of second polycrystalline materials, the processing circuitry 1 can perform a multi-sample statistical analysis. According to Example 2, the initial value of the second crystal phase information of the iterative optimization is uniformly set to the same first crystal phase information for the plurality of second polycrystalline materials. This makes it possible to stabilize the iterative optimization for the plurality of second polycrystalline materials.

Modifications

Example 1 and/or Example 2 described above is not limited to the embodiments described above, and can be modified without departing from the scope of the invention.

Modification 1

The polycrystalline materials according to Examples 1 and 2 are not limited to cement as long as they are materials that have a plurality of crystal phases having a common diffraction peak. As an example, the polycrystalline materials may be raw ores used in the steel industry. In raw ores used in the steel industry, a plurality of ferrite phases having different element compositions are mixed, and the plurality of ferrite phases have a large number of common peaks. As another example, the polycrystalline materials may be a samarium-cobalt based permanent magnet material. The samarium-cobalt based permanent magnet material is a material composed of a plurality of crystal phases having similar crystal structures different only in their laminated structure, and the plurality of crystal phases have a large number of common peaks. As another example, the polycrystalline materials may be a silicon nitride ceramic material. In the silicon nitride ceramic material, a plurality of oxynitride phases derived from the oxide used as the sintering aid are mixed, and the plurality of oxynitride phases have a large number of common peaks.

Modification 2

The diffraction data analysis method according to Examples 1 and 2 is a diffraction data analysis method assuming a crystal structure model, such as the Rietveld analysis, but is not limited to this method. As an example, a Le Bail method or a Pawley method, which is a so-called pattern decomposition method in which a crystal structure model is not assumed, may be used.

Modification 3

The second estimation unit 13 according to Examples 1 and 2 sets the first crystal phase information to the initial value of the iterative optimization. However, the second estimation unit 13 according to Modification 3 may use the first crystal phase information for regularization of the iterative optimization. As an example, the second estimation unit 13 uses a divergence between the second crystal phase information and the first crystal phase information under estimation as the regularization of the iterative optimization. Specifically, the second crystal phase information can be estimated by minimizing an objective function represented by the following Formula (1). In Modification 3, it is also possible to reduce the risk of overlooking the crystal phase information on a small amount of components of interest.

$$\text{argmin}_{(x)}\{(y - f(x))2 + \lambda(x - x0)2\} \tag{1}$$

x: a crystal phase information vector under estimation
f: a function for reconstructing diffraction spectrum data based on crystal phase information
y: an observed X-ray diffraction spectrum (second diffraction data)
$x_0$: a first crystal phase information vector
$\lambda$: an adjustment parameter (fixed value)

Modification 4

The second estimation unit 13 according to Examples 1 and 2 uses only the first crystal phase information for the iterative optimization of the second diffraction data. However, it is also effective to use other information related to the iterative optimization by the first estimation unit 12 for the iterative optimization by the second estimation unit 13. For example, the second estimation unit 13 according to Modification 4 sets the stop condition of the iterative optimization for the second diffraction data based on the optimization time and/or the optimization accuracy of the iterative optimization by the first estimation unit 12. As the accuracy of optimization, specifically, a residual error after optimization, a sensitivity of crystal phase information to the residual error, and/or an order of optimizing the crystal phase information are used.

The optimization time of the iterative optimization specifically means the time required for convergence of the iterative optimization and the number of times of updating. The residual error after optimization means an error between the first diffraction data and the diffraction data reconstructed based on the first crystal phase information after optimization. The sensitivity of the crystal phase information to the residual error means a standard error of each parameter of the crystal phase information to the residual error after optimization. The order of optimizing the crystal phase information means the order of fixing or unfixing each parameter of the crystal phase information.

As an example, if the user determines that the optimization has sufficiently converged when the number of times of updating by the first estimation unit 12 is N1, the number of times N2 of updating of the iterative optimizations by the second estimation unit 13 is assumed to be N1×α. The value α may be set to a discretionary value, for example, a fixed value such as 2. As another example, if the residual error after the optimizations by the first estimation unit 12 is E1, the termination condition of the iterative optimization by the second estimation unit 13 is that the residual error E2 is E1×β. The value β may be set to a discretionary value, for example, a fixed value such as 2.

Thus, setting the termination condition of the iterative optimization of the second estimation unit 13 based on the optimization result of the first estimation unit 12 is effective from the viewpoint of improving the efficiency and accuracy of the optimization process of the second estimation unit 13. In particular, if the first estimation unit 12 receives the first diffraction data 51 as an input, the condition for optimizing the first diffraction data 51 is more stable and accurate than the second diffraction data 52 (because the features of the data are not buried and it is easy to avoid under-determined conditions). Therefore, the condition is often suitable for estimating a numerical value serving as a criterion for the termination condition such as the residual error E2. In a case of multi-sample evaluation in which a plurality of pieces of second diffraction data are present, it is difficult to visually confirm the convergence results of all pieces of data; therefore, the setting accuracy of such a quantitative termination condition of optimization is important.

According to Modification 4, by using other information related to the iterative optimization by the first estimation unit 12 for the iterative optimization by the second estimation unit 13, it is possible to increase the accuracy and efficiency of the iterative optimization by the second estimation unit 13.

Overview

According to the embodiment described above, the crystal phase information extraction apparatus 100 includes at least the first estimation unit 12 and the second estimation unit 13. The first estimation unit 12 estimates first crystal phase information on the first polycrystalline material. The second estimation unit 13 executes iterative optimization on second diffraction data acquired from a second polycrystalline material in which the component ratio of the crystal phase of interest is smaller than that of the first polycrystalline material using the first crystal phase information, and estimates second crystal phase information on the second polycrystalline material.

According to the above configuration, even if the diffraction peak of the crystal phase (sub-phase) of interest contained in the second polycrystalline material is small and is buried in the diffraction peak of the adjacent main phase, it is possible to reduce the possibility of occurrence of a local solution in which the crystal phase information of the sub-phase becomes a zero value or a negative value. That is, according to the present embodiment, it is possible to accurately or stably extract the crystal phase information even for the polycrystalline material in which the second polycrystalline material includes the common diffraction peak and the crystal phase information is difficult to extract. In addition, it is possible to accurately or stably perform the multi-sample statistical analysis.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A crystal phase information extraction apparatus comprising processing circuitry configured to:
   estimate first crystal phase information on a first polycrystalline material; and
   perform, using the first crystal phase information, iterative optimization on diffraction data acquired from a second polycrystalline material having a component ratio of a crystal phase of interest smaller than that of the first polycrystalline material, and to estimate second crystal phase information on the second polycrystalline material.

2. The crystal phase information extraction apparatus according to claim 1, wherein the first polycrystalline material and the second polycrystalline material are a same kind of polycrystalline material having a common diffraction peak.

3. The crystal phase information extraction apparatus according to claim 1, wherein peaks of diffraction data of the crystal phase of interest based on the first crystal phase information are larger in number than peaks of the diffraction data of the crystal phase of interest based on the second crystal phase information.

4. The crystal phase information extraction apparatus according to claim 1, wherein the processing circuitry is configured to perform iterative optimization on diffraction data acquired from the first polycrystalline material produced under production conditions different from those for the second polycrystalline material, and to estimate the first crystal phase information.

5. The crystal phase information extraction apparatus according to claim 1, wherein the processing circuitry is configured to process the diffraction data acquired from the second polycrystalline material to generate diffraction data related to a pseudo first polycrystalline material, to perform iterative optimization for the diffraction data, and to estimate the first crystal phase information.

6. The crystal phase information extraction apparatus according to claim 1, wherein the processing circuitry uses the first crystal phase information as an initial value of the iterative optimization.

7. The crystal phase information extraction apparatus according to claim 1, wherein the processing circuitry uses a divergence between the first crystal phase information and the second crystal phase information under estimation in the iterative optimization as regularization of the iterative optimization.

8. The crystal phase information extraction apparatus according to claim 1, wherein the processing circuitry is configured to set a termination condition of the iterative optimization for the diffraction data acquired from the second polycrystalline material, based on an optimization time and/or an optimization accuracy of the iterative optimization performed by the first estimation unit.

9. A crystal phase information extraction method comprising:

estimating first crystal phase information on a first polycrystalline material; and performing, using the first crystal phase information, iterative optimization on diffraction data acquired from a second polycrystalline material having a component ratio of a crystal phase of interest smaller than that of the first polycrystalline material, and estimating second crystal phase information on the second polycrystalline material.

10. A non-transitory computer readable storage medium including computer executable instructions, wherein the instructions, when executed by a processor, cause the processor to perform operations comprising:

estimating first crystal phase information on a first polycrystalline material; and performing, using the first crystal phase information, iterative optimization on diffraction data acquired from a second polycrystalline material having a component ratio of a crystal phase of interest smaller than that of the first polycrystalline material, and estimating second crystal phase information on the second polycrystalline material.

* * * * *